United States Patent
Yokoo (10) Patent No.: US 8,355,366 B2
(45) Date of Patent: Jan. 15, 2013

(54) WIRELESS COMMUNICATIONS NODE USED IN AD HOC NETWORK AND METHOD THEREOF

(75) Inventor: Kaoru Yokoo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 12/714,071

(22) Filed: Feb. 26, 2010

(65) Prior Publication Data
US 2010/0150052 A1 Jun. 17, 2010

Related U.S. Application Data

(63) Continuation of application No. PCT/JP2007/067119, filed on Sep. 3, 2007.

(51) Int. Cl.
*H04W 4/00* (2009.01)
(52) U.S. Cl. .......... 370/328; 370/392; 455/406
(58) Field of Classification Search ............ 370/328, 370/315; 455/406; 705/40
See application file for complete search history.

(56) References Cited

U.S. PATENT DOCUMENTS

| | | | |
|---|---|---|---|
| 2003/0054796 A1* | 3/2003 | Tamaki et al. | 455/406 |
| 2005/0091157 A1* | 4/2005 | Suzuki et al. | 705/40 |
| 2005/0165696 A1 | 7/2005 | Jakobsson | |
| 2005/0197098 A1* | 9/2005 | Trossen | 455/406 |
| 2005/0220101 A1 | 10/2005 | Westhoff et al. | |
| 2006/0067316 A1 | 3/2006 | Johnson et al. | |

FOREIGN PATENT DOCUMENTS

| | | |
|---|---|---|
| EP | 1599973 B1 | 7/2010 |
| JP | 2005123781 | 5/2005 |
| JP | 2005295538 | 10/2005 |
| JP | 2006515131 A | 5/2006 |
| WO | 2004080002 A1 | 9/2004 |

OTHER PUBLICATIONS

Japanese Notification of Reasons for Refusal dated Feb. 14, 2012 issued in application No. 2009-531030.
Yosuke Ito, "Study on Fairness in Multiple Wireless Links Sharing System", IPSJ SIG Technical Report, vol. 2004, No. 21, pp. 147-154, Mar. 5, 2004.
Zhong, S. Chen, J. Yang, Y.R., Sprite: A simple, cheat-proof, credit-based system for mobile ad-hoc networks, INFOCOM 2003. Twenty-Second Annual Joint Conference of the IEEE Computer and Communications Societies. IEEE, vol. 3, Apr. 3, 2003, p. 1987-1997, "III. Overview of our Approach".
International Search Report dated Sep. 25, 2007, in corresponding International Application No. PCT/JP2007/067119.
Extended European Search Report dated Nov. 5, 2012 received in 07806592.7-2416/2187573 PCT/JP2007067119.

* cited by examiner

*Primary Examiner* — Albert T Chou
(74) *Attorney, Agent, or Firm* — Murphy & King, P.C.

(57) ABSTRACT

A wireless communications node, being included in a multi-hop route starting from a source node and terminating at a destination node, has a receiving part configured to receive signals including transmission data prepared by the source node and transferring the received signals to a succeeding node, a preparing part configured to prepare source node data including at least identification data of the source node based on a predetermined portion of the transmission data, and a reporting part configured to report the source node data and relay data to a management node that manages cost data of plural nodes included in an ad hoc network. The relay data include the cost data and station data including at least identification data of the wireless communications node.

8 Claims, 12 Drawing Sheets

| RELAY STATION TOKEN ||
|---|---|
| STATION DATA | COST DATA |
| • RELAY SOURCE<br><br>• RELAY DESTINATION<br><br>• RELAY TIME<br><br>• ROUTE DATA | • TRANSFER PERIOD<br><br>• TRANSMISSION POWER<br><br>• COMMUNICATION QUALITY<br><br>• DATA AMOUNT |

| TRANSMISSION STATION TOKEN |
|---|
| ◎ TRANSMISSION SOURCE (X)<br><br>・ TRANSMISSION DESTINATION (Y)<br><br>・ TRANSMISSION TIME<br><br>・ DATA LENGTH |

WIRELESS COMMUNICATIONS NODE USED IN AD HOC NETWORK AND METHOD THEREOF

CROSS-REFERENCE TO RELATED APPLICATIONS

This application is based upon and claims the benefit of priority of International Patent Application No. 2007-067119 filed on Sep. 3, 2007, the entire contents of which are incorporated herein by reference.

FIELD

The embodiments discussed herein are related to a wireless communications node used in an ad hoc network and a method thereof.

BACKGROUND

In a wireless multi-hop ad hoc network, a user's communications terminal (e.g., including base station, access point) is used as a relay terminal for performing another user's communications. The user of the relay terminal is to absorb the costs regarding the communications of the other user. In a case of wireless communications, the location of a relay terminal of the user is not fixed, unlike that of wire communications. Thus, the cost is absorbed for relay changes whenever the relay is performed. For example, in a case of relaying nodes that are located far from each other, a large amount of electric power is consumed (a large amount of cost is absorbed) whereas a small amount of electric power is consumed in a case where the distance between nodes is short. Therefore, calculation of cost by merely counting the number of relays as with the conventional wire communications would cause unfairness. This unfairness is a problem that occurs due to the characteristics of the multi-hop ad hoc network. This may be the psychological or economic reasoning that prevents popularization and expansion of the ad hoc network. This unfairness of cost has a greater psychological influence on the user particularly in a battery driven wireless network because this unfairness of cost affects the length of the standby time of a terminal.

Patent Document 1 discloses granting benefits by adding points whenever one uses a function or resource of one's terminal as a relay terminal for others, so as to increase the number of users that can perform relay, moreover, increase the number of service areas. However, how the points (i.e. costs) are calculated is unclear. Further, in a case where such costs are associated with benefits, there is a need to prevent unauthorized obtaining of points by security phishing. However, how it is prevented is unclear. An increase in the number of users willing to perform relay and the expansion of service areas can be induced only where the points and costs can be accurately and safely calculated. However, no such technology has yet been reported. Patent Document 1: Japanese Laid-Open Patent Publication No. 2005-123781

SUMMARY

An embodiment of the present invention provides a wireless communications node included in a multi-hop route from a source node to a destination node, the wireless communications node including: a part for receiving signals including transmission data prepared by the source node and transferring to a succeeding node; a part for preparing source node data including at least identification data of the source node based on a predetermined portion of the transmission data; and a part for reporting the source node data and relay data to a management node that manages cost data of plural nodes included in an ad hoc network; wherein the relay data include the cost data and station data including at least identification data of the wireless communications node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

In the following, "relay station token" according to the first embodiment of the present invention, "relay station token" and "transmission station token" according to the second embodiment of the present invention, and "relay station token" and "transmission station token" according to the third embodiment of the present invention have the significance of indicating how heavy a load has been borne during relaying of wireless signals.

In a wireless communications node used in a first embodiment of the present invention, signals including transmission data and relay data prepared by a source node are transmitted to a subsequent node. The relay data include at least station data containing identification data of the wireless node and cost data that change together with the load required for relaying transmission data. The relay data are reported to a management node which manages cost data via a destination node. Because a series of relay data prepared by corresponding relay nodes is reported to the management node via the destination node, the management node can appropriately calculate the cost for each node.

The report of relay data to the management node may be conducted regularly or irregularly.

The signals which include at least relay data may be encrypted and reported to the management node. The encryption may be encryption using a public key. Encryption is preferred from the standpoint of safely reporting relay data to the management node.

The station data included in the relay data may include data indicative of one or more of relay time, identification data of a relay source node, or identification data of a relay destination node. The cost data included in the relay data may include data indicative of one or more of transfer time, data length, transmission power, communication quality of wireless link, or distance between nodes.

A wireless communications node of a second embodiment of the present invention includes a part for receiving signals including transmission data prepared by the source node and transferring the signals to a subsequent node; a part for preparing source node data including at least identification data of the source node based on a predetermined portion of the transmission data; and a part for reporting the source node data and the relay data to a management node which manages cost data of plural nodes constituting an ad hoc network. The relay data include cost data and station data including at least identification data of the wireless communications node. The cost data changes together with the load required for relaying the transmission data. Because the relay data and the source node data are reported from each relay node to the management node, the management node can appropriately calculate the cost for each relay node.

Source node data X are prepared by duplicating a predetermined portion of signals to be relayed. This is preferable from the standpoint of easily preparing report data to be reported, to the management node.

A wireless communications node according to a third embodiment of the present invention includes a part for receiving signals including transmission data prepared by the source node; a part for removing a portion of the signals that contain ticket data of a required amount from the received signals and transferring the remaining signals to a subsequent node; a part for preparing source node data including at least identification data of the source node based on the portion of signals; and a part for reporting the source node data and relay data to the management node that manages cost data of plural nodes constituting an ad hoc network. The relay data include cost data and station data including at least identification data of the wireless communications node. The cost data change together with the load required for relaying the transmission data. Because relay data and source node data are reported from each relay node to the management node, the management node can appropriately calculate the cost for each relay node.

From the standpoint of dealing with a case where no ticket data of a required amount are included in the received signals, signals including transmission data and debit data may be transmitted to a subsequent node and report data including relay data and debit data may reported to the management node instead of removing a portion of signals and transferring the remaining signals.

In addition to the identity of the source node, data may be indicative of one or more of data length, transmission time from the source node, and the destination node.

First Embodiment

<System>

Figure 1:
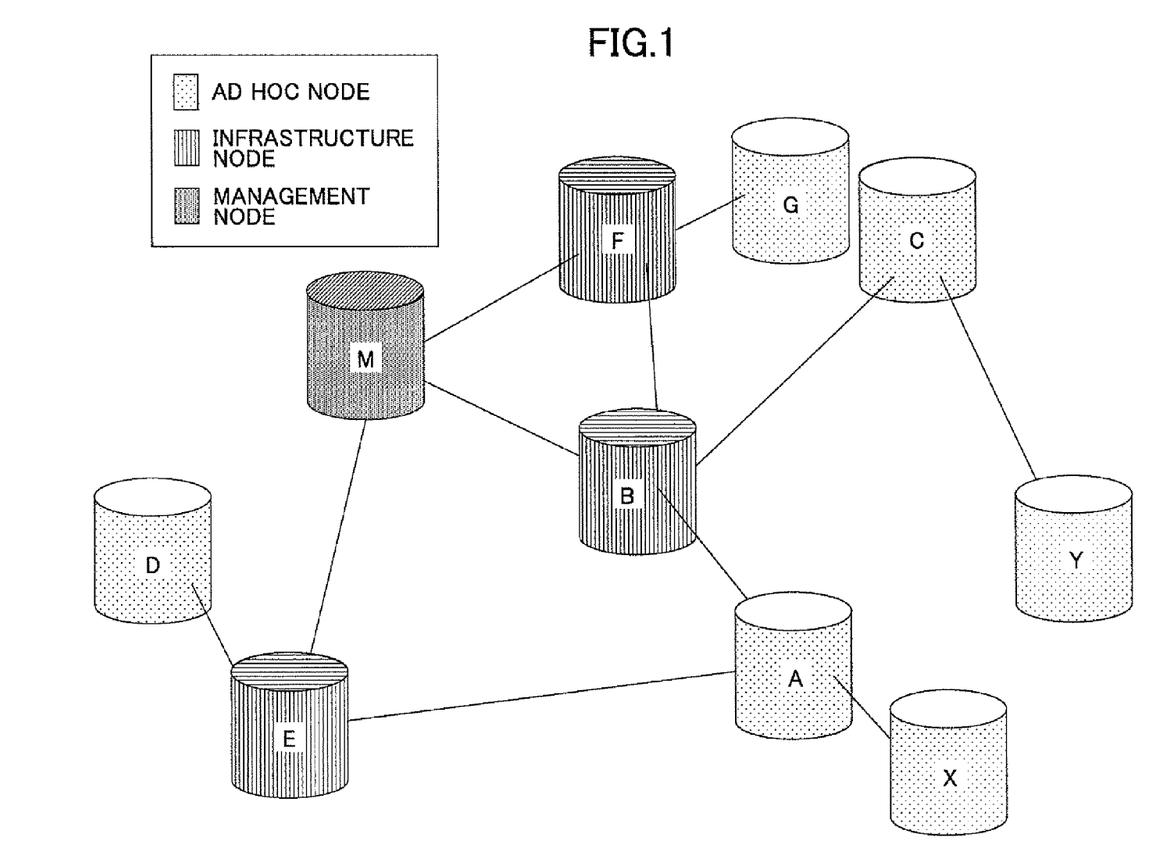
FIG. 1 is a schematic diagram illustrating a system of an ad hoc network that can be used for an embodiment of the present invention.

FIG. 1 is a schematic diagram illustrating a system of an ad hoc network. FIG. 1 illustrates nodes A, C, D, G, X, and Y which are ad hoc nodes; nodes B, E, and F which are infrastructure nodes; and a node M which is a management node. These nodes may be mobile terminals or fixed terminals. Typically, an ad hoc node is user equipment which is a wireless communications node capable of transmitting transmission data to a target node by performing one or more hops. For example, the node X and the node A can establish communications in one hop. The node A and the node C cannot establish communications in one hop. The nodes A and C can only communicate with each other via the node B. The infrastructure node is a wireless communications node prepared by the system beforehand and dedicated for relaying transmission data. The infrastructure node and the ad hoc node share in common that they are both wireless communications nodes capable of performing wireless communications with an adjacent node. The management node manages cost data indicating how much an ad hoc node has contributed to the system as a relay node. As described below, the cost data according to the first embodiment are reported from destination nodes to the management node in a bundle whereas the cost data according to the second and third embodiments are separately reported from each relay node to the management node.

<Exemplary Operation>

Figure 2:
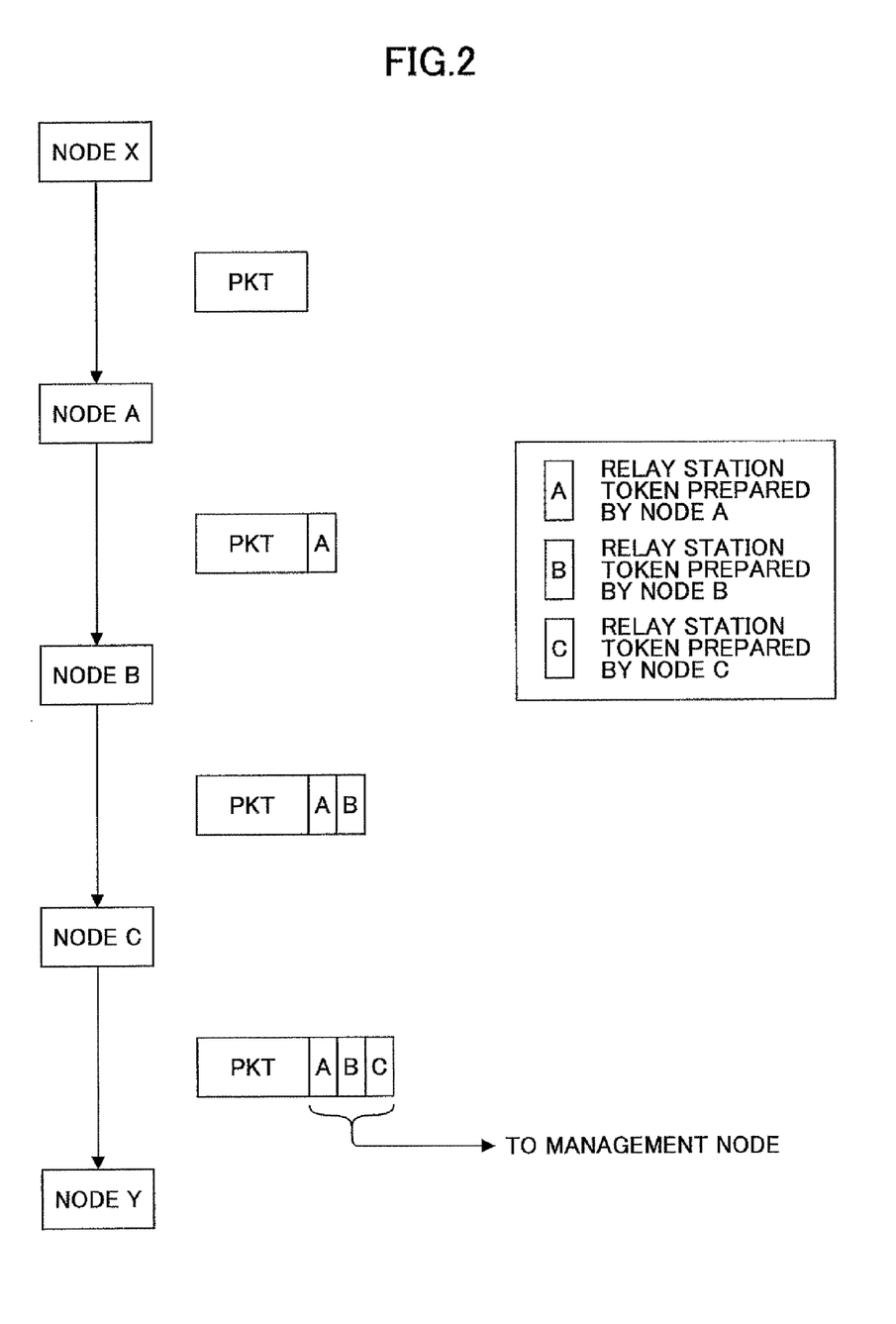
FIG. 2 is a schematic diagram illustrating an example of an operation according to a first embodiment of the present invention.

FIG. 2 illustrates an exemplary operation according to the first embodiment of the present invention. For the sake of illustration, a packet(s) PKT is transmitted from the node X to the node Y via nodes A, B, and C. This kind of multi-hop route may be established by any appropriate method known in the field of the art. The nodes A, B, and C each may be aware beforehand that itself is a relay node or may confirm this upon receiving the packet PKT. The packet PKT may include any suitable data desired to be transmitted by the node X. Although a packet is exemplified for the sake of explanation, other suitable units of data may be used.

First, the node X transmits the packet PKT to the node A. The node A receives the packet PKT from the node X. The node A prepares data referred to as "relay station token" in this description. The relay station token is expressed as "A" in FIG. 2.

Figure 3:
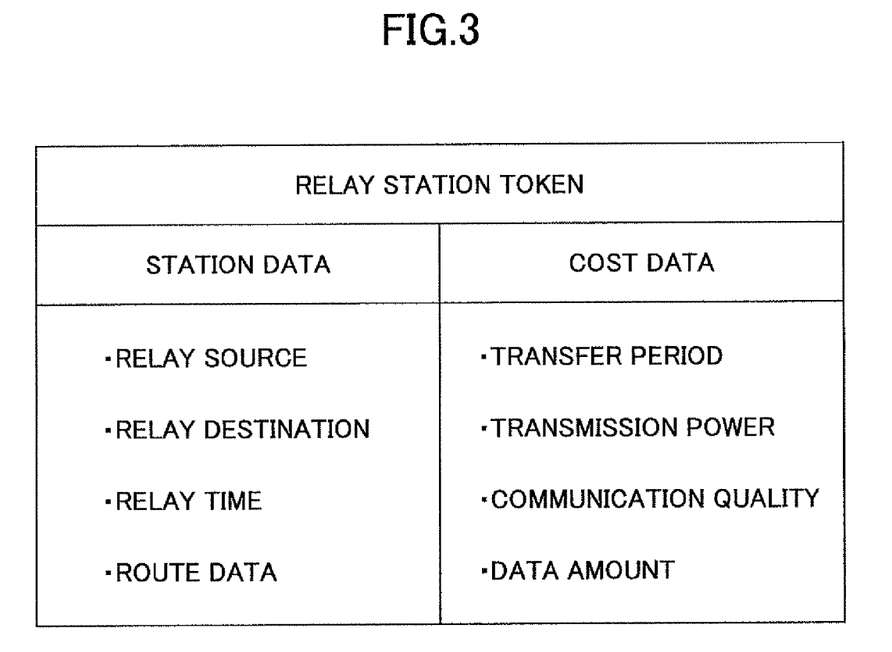
FIG. 3 is a schematic diagram illustrating a token of a relay station.

FIG. 3 illustrates an example of data included in a relay station token. As one example, a relay station token includes station data and cost data. The station data may include, for example, data indicating a relay source, data indicating a relay destination, relay time, and multi-hop route data (not all of the data illustrated in FIG. 3 are required to be included in the station data but one or more may be included in the station data). The data indicating the relay source may be identification data designating the relay node itself or identification data designating a preceding node in the multi-hop route. The identification data may be a MAC-ID or any suitable data that distinguishes nodes. The data indicating the relay destination may designate a succeeding node in the multi-hop route. For example, in a case where the packet PKT is transmitted from the node X to the node B by relaying from the node A, the relay source is node A and the relay destination is node B.

The cost data may include, for example, data transfer time (transfer period), transmission power, communication quality, and data amount. Not all of the data illustrated in FIG. 3 are required to be included in the cost data but one or more may be included in the cost data. The cost data may include any suitable amount (metrics) that changes in correspondence with the weight (light/heavy) of the load required for relaying the packet. For example, the amount (large/small) of data (large/small), the status (poor/good) of wireless transmission (may be expressed with, for example, RSSI, SIR, SINR, CSI, path loss), the required quality (high/low), the length (long/short) of transfer time, the transmission power (high/low) for maintaining a required quality, or the transmission format (e.g., modulating type) used may be associated with the weight of the cost. As described below, the management node determines how much each node has contributed to the relaying of signals based on the cost data. Accordingly, the relay station token has the significance of indicating how heavy a load was borne during relaying of wireless signals.

As illustrated in FIG. 2, the relay station token "A" is transferred together with the packet PKT to the succeeding node B. The relay station token A may be encrypted using any suitable method known in the field of the art. For example, a public key method may be used for the encryption. The encryption may be performed by using a method (key) unique for a corresponding relay node or by using a method (key) shared by plural nodes. Although the relay station token A may be prepared in any suitable protocol layer, it is typically added to the packet PKT in a MAC layer or an IP layer. Alternatively, an RSV area may be used for the relay station token.

The node B receives a signal including the packet PKT and the relay station token A from the node A. As illustrated with "B" in FIG. 2, the node B also prepares a relay station token B. In this case, for example, the relay source is node B and the relay destination is node C. The node B transfers a signal including the signal received from node A and the relay station token B to a succeeding node. The relay station token B may be encrypted by using a given method. Because the node B according to this embodiment is an infrastructure node prepared by the system and has a comparatively high reliability, the same encrypting method may be used by plural of the infrastructure nodes.

The node C receives the signal including the packet PKT and the relay station tokens A, B from the node B. As illustrated with "C" in FIG. 2, the node C also prepares a relay station token C and encrypts the relay station token C. In this case, for example, the relay source is node C and the relay destination is node Y. The node C transfers a signal including the signal received from node B and the relay station token C to a succeeding node.

The node Y receives the signal including the packet PKT and the relay station tokens A, B, C from the node C. The node Y extracts the packet PKT and the relay station nodes A, B, C from the received signal. Thereby, the transmission data (packet PKT) prepared by the node X reaches the node Y via a multi-hop route (nodes X, A, B, C, Y). The relay station tokens A, B, and C are reported to the management node M. The report may be conducted regularly (e.g., every hour) or irregularly. In a case of the latter, the relay station tokens may be reported when the relay station tokens have reached a predetermined amount or whenever a report is requested from the management node or other nodes. Moreover, in addition to reporting the relay station tokens regularly, the relay station tokens may be reported upon request.

The management node M receives a relay station token from a node corresponding to a destination node of the multi-hop route or a target node. The management node M manages the relay station tokens in correspondence with the nodes. In the above-described example, the relay station token of node A, the relay station token of node B, and the relay station token of node C are extracted from the received signal and are managed respectively. The management node M releases (decrypts) the encryption of each relay station token. As described above, the relay station token includes cost data. The cost data include the amount (metrics) that may change in correspondence with the load of relaying. The management node calculates how much each node has contributed for the relay and performs, for example, granting of benefits or billing in correspondence with the amount of contribution by the node.

<Communications Node>

Figure 4:
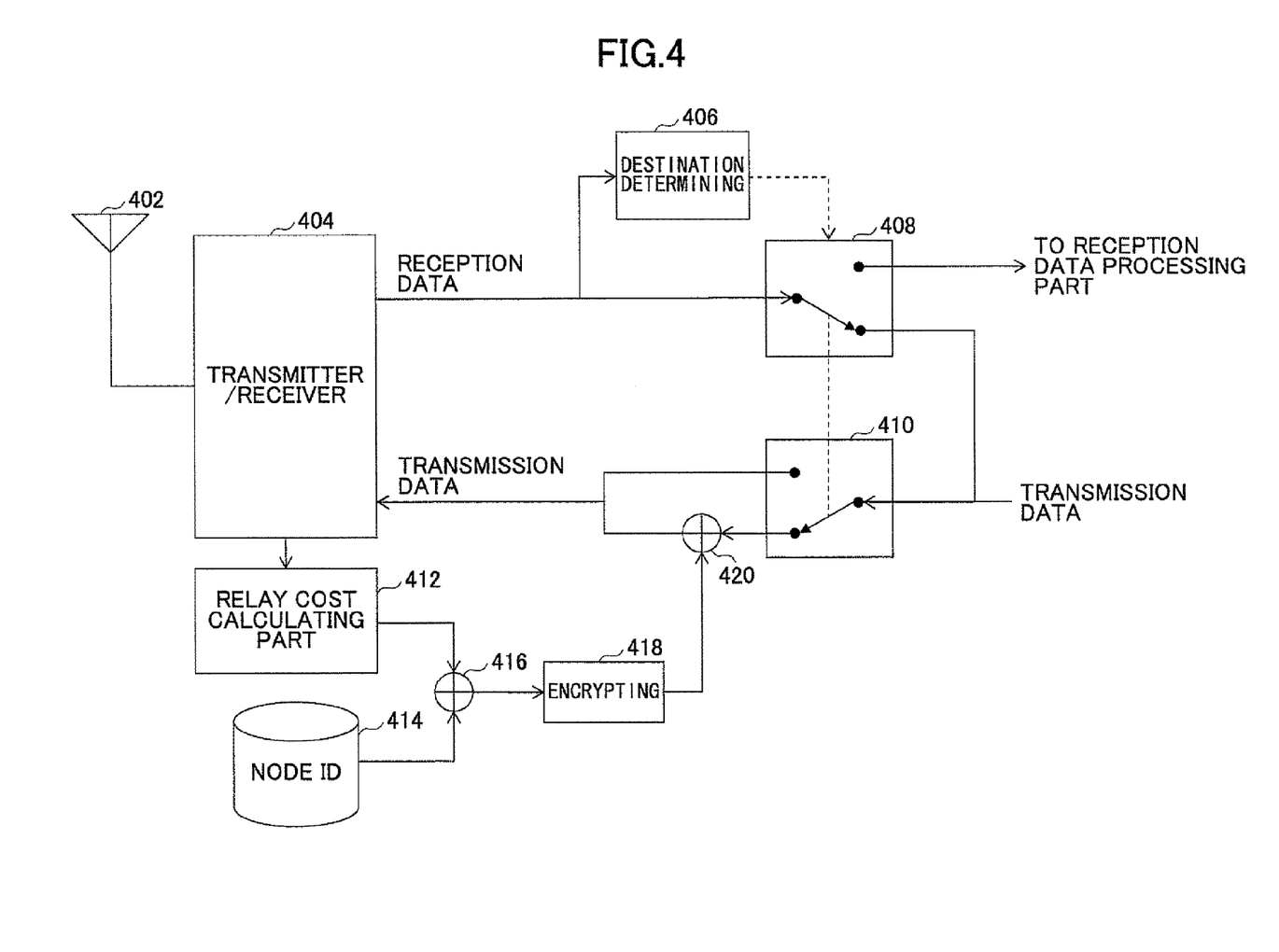
FIG. 4 is a block diagram illustrating a communication node used in the first embodiment of the present invention.

FIG. 4 schematically illustrates a block diagram of a communications node according to the first embodiment of the present invention. The communications node may be any suitable wireless communications node used in an ad hoc network. That is, the communications node may be a transmission source node (source node), a relay node, or a destination node according to necessity. In FIG. 4, an antenna 402, a transmitter/receiver 404, a destination determining part 406, switches 408 and 410, a relay cost calculating part 412, a memory 414, a combining part 416, an encrypting part 418, and a combining part 420 are illustrated.

The transmitter/receiver 404 receives and transmits wireless signals via the antenna 402.

The destination determining part 406 confirms a destination of a received signal and determines whether the communications node itself is a destination node or a relay node. The confirming of the destination may be performed based on overhead data (control data) of the received signal.

In a case where the communications node itself is determined as a relay node according to a determination result from the destination determining part 406, the switch 408 routes the reception signal to the switch 410. In a case where the communications node itself is determined as a destination node, the switch 408 guides the reception signal to a subsequent reception data processing part.

The switch 410 operates in cooperation with the switch 408. In a case where the reception signal is to be transferred to a succeeding node, the switch 410 guides the reception signal to a transmission route for transferring the reception signal. In a case where the communications node itself operates as a transmission source node, the switch 410 guides data to be transmitted to the transmitter/receiver 404.

In a case where the communications node itself operates as a relay node, the relay cost calculating part 412 calculates how much load, work, or cost is to be incurred for transferring the reception signal to a succeeding node and outputs the calculation result as cost data. The cost data may be referred to as a contribution. The cost may be calculated based on various metrics. For example, a large amount of data, a long data transmission time, a large amount of transmission power consumed, poor communications quality (wireless transmission environment) of a wireless link, or a long geographical distance between relay nodes may be associated with large cost. On the other hand, a small amount of data, a short data transmission time, small amount of transmission power consumed, good communications quality (wireless transmission environment) of a wireless link, or a short geographical distance between relay nodes may be associated with small cost. Any one of these determination criteria may be used. Alternatively, two or more of these criteria may be discretionally used in combination. For example, the contribution may be expressed depending on the level to which the product of the data amount and quality corresponds among several tens of predetermined contribution levels. It is needless to say that basic data for deriving the contribution (e.g., transfer time, data length) may be included in the cost data. In addition to or as an alternative of the basic data, the contribution derived from one or more of the determination criteria may be included in the cost data.

The memory 414 stores station data including, for example, identification data (ID) of the communications node itself, identification data (ID) of an adjacent node, and relay time.

The combining part 416 generates a relay station token by combining station data and cost data. The combining may be performed using any suitable multiplexing method known in the field of the art (e.g., time division multiplexing, frequency division multiplexing, code division multiplexing).

The encrypting part 418 encrypts the relay station token. As one example, the encryption is performed by a public key method.

The combining part 420 generates a signal to be transmitted to a succeeding node by combining data to be transferred and the relay station token (encrypted). The signal is input as transmission data to the transmitter/receiver 404, converted into a wireless signal, and output from the antenna 402.

<Management Node>

Figure 5:
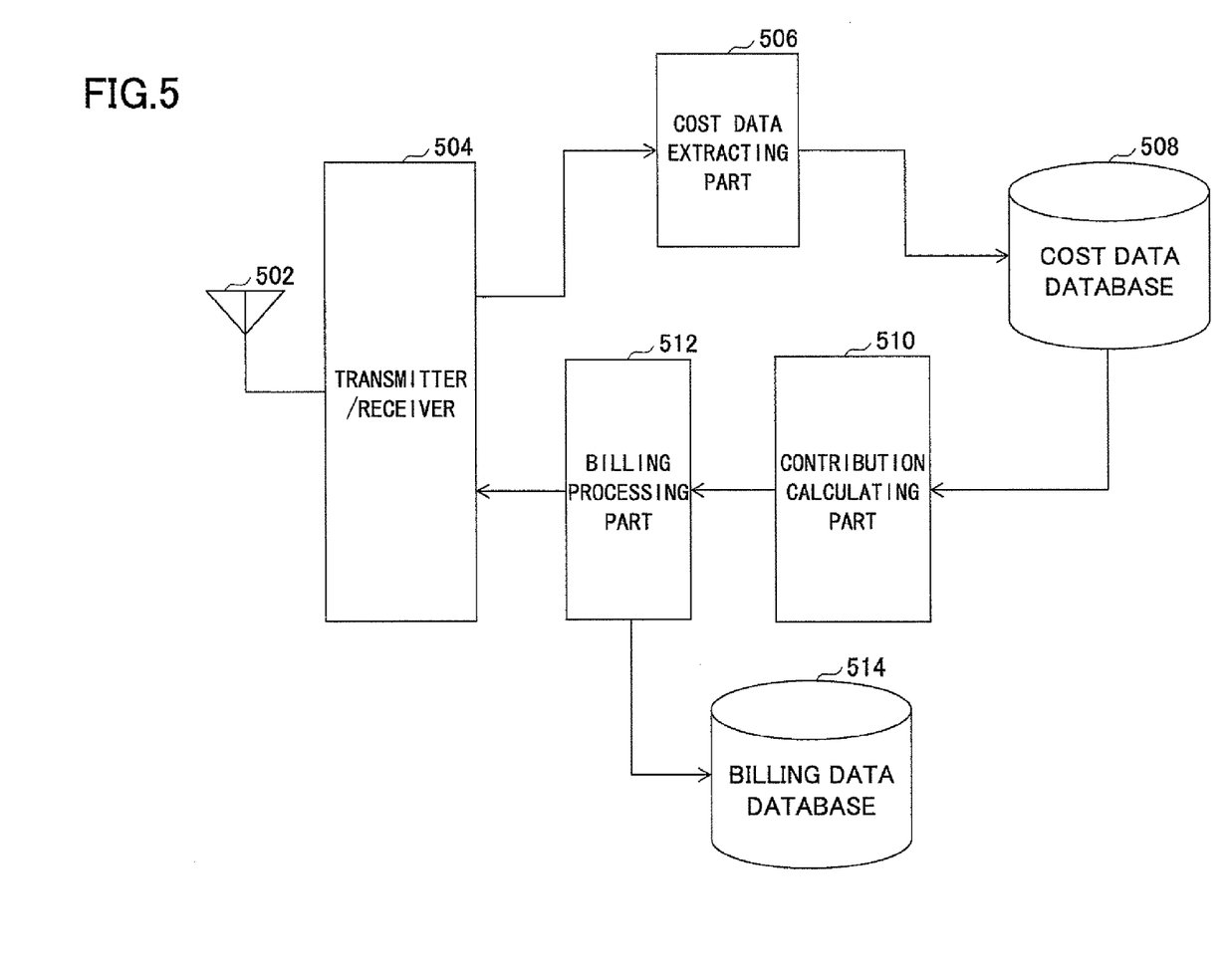
FIG. 5 is a block diagram illustrating a management node.

FIG. 5 illustrates a management node. In FIG. 5, an antenna 502, a transmitter/receiver 504, a cost data extracting part 506, a cost data database 508, a contribution calculating part 510, a billing process part 512, and a billing data database 514 are illustrated.

The transmitter/receiver 504 performs reception and transmission of wireless signals via the antenna 502.

The cost data extracting part 506 extracts and decrypts a relay station token of each node in a received signal.

The cost data database 508 stores the extracted and decoded cost data corresponding to each node.

The contribution calculating part 510 calculates contribution indicative of how much each node has contributed to relay based on the cost data. In a case where the cost data includes basic data for deriving contribution, the contribution calculating part 510 derives the contribution. However, as described above, the contribution may be included in the cost data.

Based on the contribution for the relay by each node, the billing processing part 512 performs a billing process with consideration of benefits such as discounts of fees to be paid by the user. The billing data are stored in the billing data database 514. The billing data are reported to a financial institution and other agencies. The contribution, benefits, points, billing data, etc. may be reported to each user.

Second Embodiment

<Exemplary Operation>

Figure 6:
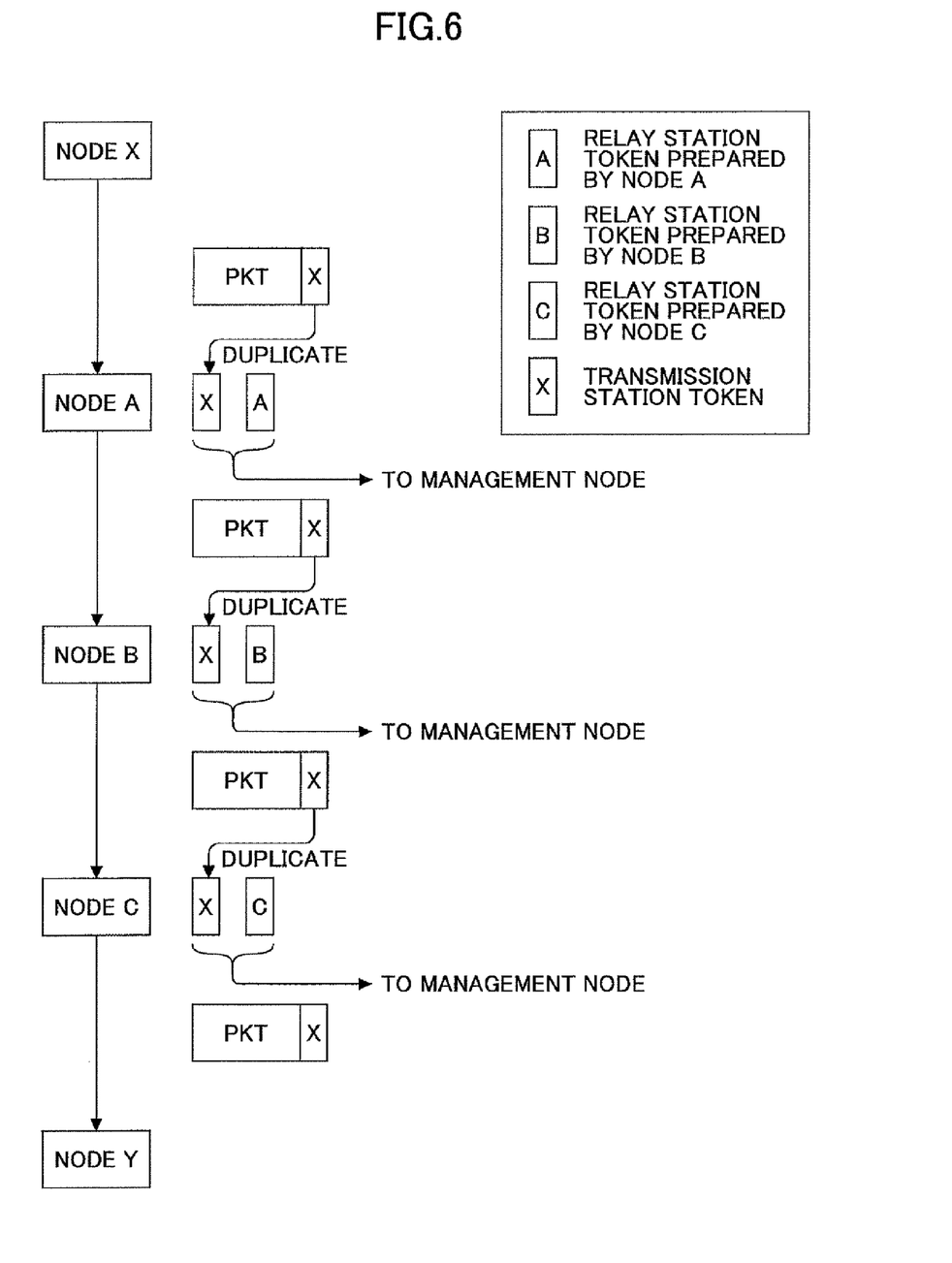
FIG. 6 is a schematic diagram illustrating an example of an operation according to a second embodiment of the present invention.

FIG. 6 illustrates an exemplary operation according to the second embodiment of the present invention. Similar to the first embodiment, a packet PKT is transmitted from node X to node Y via nodes A, B, and C.

First, the node X transmits the packet PKT to the node A. The node A receives the packet PKT from the node X. The node A, in addition to preparing a relay station token indicated as "A", prepares a transmission station token indicated as "X". Since the relay station token is described above, further explanation of the relay station token is omitted. The node A prepares the transmission station token X by duplicating a predetermined portion of the received signal.

Figure 7:
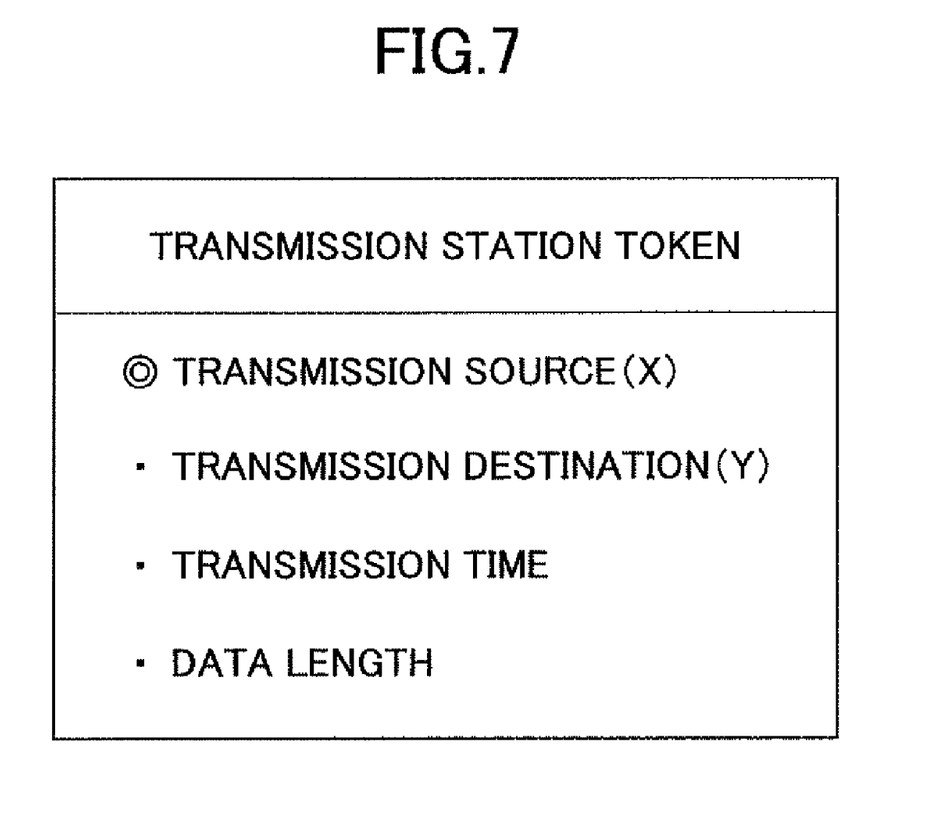
FIG. 7 is a schematic diagram illustrating a token of a transmitting station.

FIG. 7 illustrates an example of data included in a transmission station token. As one example, a transmission station token may include data indicating, for example, a transmission source, a transmission destination, transmission time, and data length. Although the data indicating the transmission source is a requisite (◎), the other data (·) are optional. In this example, the transmission source is node X, and the transmission destination is node Y.

As illustrated in FIG. 6, the node A transfers the received signal (PKT and X) as it is to the succeeding node B. Further, the node A reports report data including the transmission station token X prepared from the received signal and the relay station token A to the management node M. The report may be conducted regularly or irregularly. The report may be conducted in units of packets or in units of frames containing plural packets. The report data may be encrypted using any suitable method in known in the field of the art. For example, a public key method may be used for the encryption. The encryption may be performed by using a method (key) unique for a corresponding relay node or by using a method (key) shared by plural nodes. Although the report data may be prepared in any suitable protocol layer, it is typically prepared in a MAC layer or an IP layer. Alternatively, an RSV area may be used for the report data.

The node B receives a signal including the packet PKT and the transmission station token X from the node A and transfers the signal as it is to the succeeding node C. The node B, in addition to preparing a relay station token B, prepares a transmission station token X by duplicating a predetermined portion of the received signal. The node B encrypts report data including the relay station token B and the transmission station token X and regularly or irregularly reports the report data to the management node M.

The node C receives a signal including the packet PKT and the transmission station token X from the node B and transfers the signal as it is to the succeeding node Y. The node C, in addition to preparing a relay station token C, prepares a transmission station token X by duplicating a predetermined portion of the received signal. The node C encrypts report data including the relay station token C and the transmission station token X and regularly or irregularly reports the report data to the management node M.

The node Y receives a signal including the packet PKT and the transmission station token X from the node C. Thereby, the transmission data (packet PKT) prepared by the node X reaches the node Y via a multi-hop route (nodes X, A, B, C, Y). Unlike the first embodiment, the destination node Y of the second embodiment does not need to report cost data to the management node M.

The management node M receives a report of the relay station token and the transmission station token from each relay node in the multi-hop route. By the combination of the relay station token and the transmission station token, the relationship between transmission data, relay node, and cost data can be uniquely identified. Therefore, the relay station token and the transmission station token have the significance of indicating how heavy a load was borne during relaying of wireless signals. The management node M manages the relay station token of each node. The relay node M decrypts the encryption of each relay station node, calculates how much each node has contributed for relay based on the cost data included in the relay station token, and performs, for example, granting of benefits or billing in correspondence with the contribution.

<Communications Node>

Figure 8:
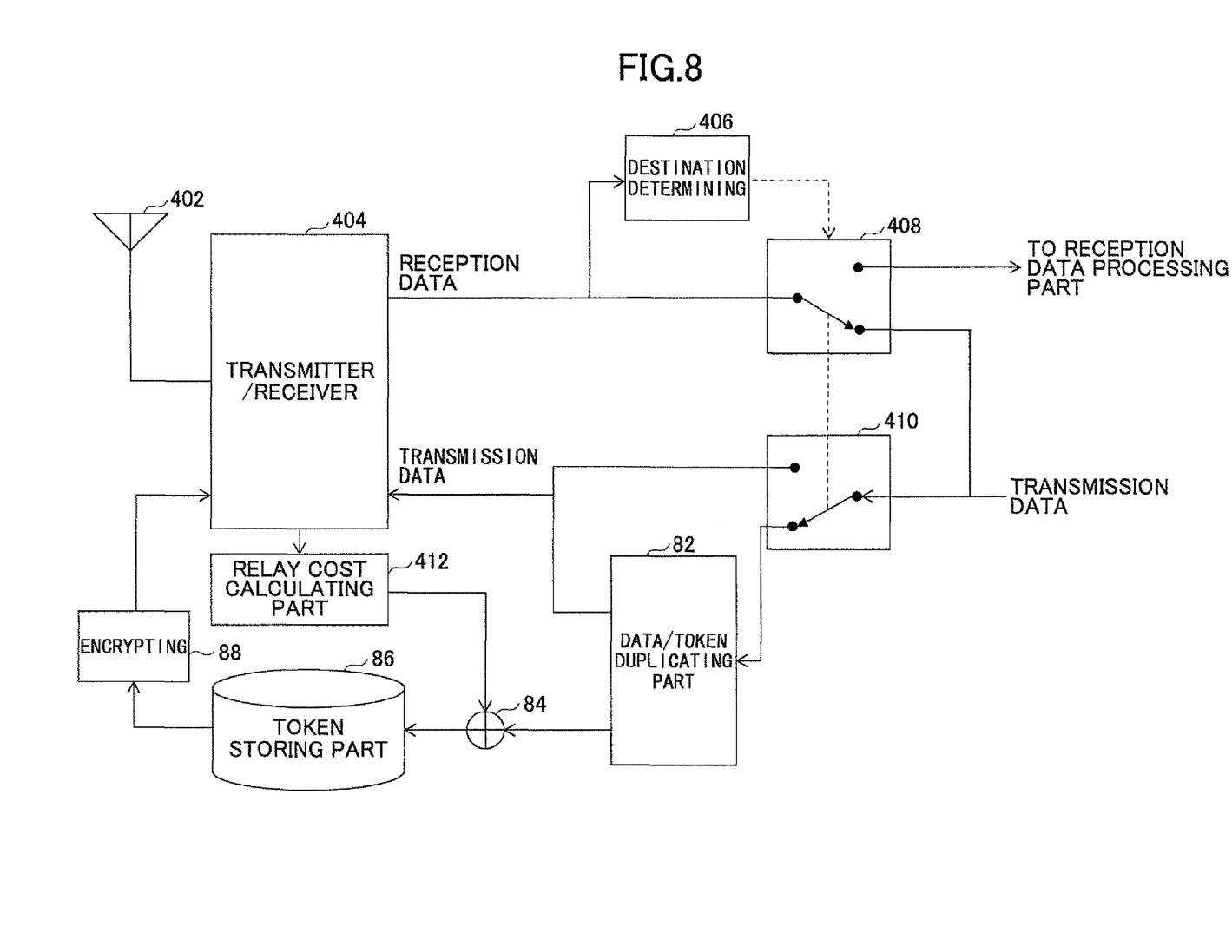
FIG. 8 is a block diagram illustrating a communication node used in the second embodiment of the present invention.

FIG. 8 schematically illustrates a block diagram of a communications node according to the second embodiment of the present invention. The communications node is substantially the same as the communications node of the first embodiment. Like components of the communications node of the second embodiment are denoted with like reference numerals as those of the first embodiment and are not further explained.

In FIG. 8, a data/token duplicating part 82, a combining part 84, a token storage part 86, and an encrypting part 88 are illustrated.

The data/token duplicating part 82 prepares a transmission station token X by duplicating a predetermined portion of a received signal prior to relaying the received signal.

The combining part 84 combines a relay station token from the relay cost calculating part 412 and a transmission station token, and outputs the combination as report data.

The token storage part 86 stores the report data.

The encrypting part 86 extracts the report data at a predetermined timing for performing the reporting, encrypts the extracted report data, and outputs the encrypted report data to the transmitter/receiver 404.

Third Embodiment

<Exemplary Operation>

Figure 9:
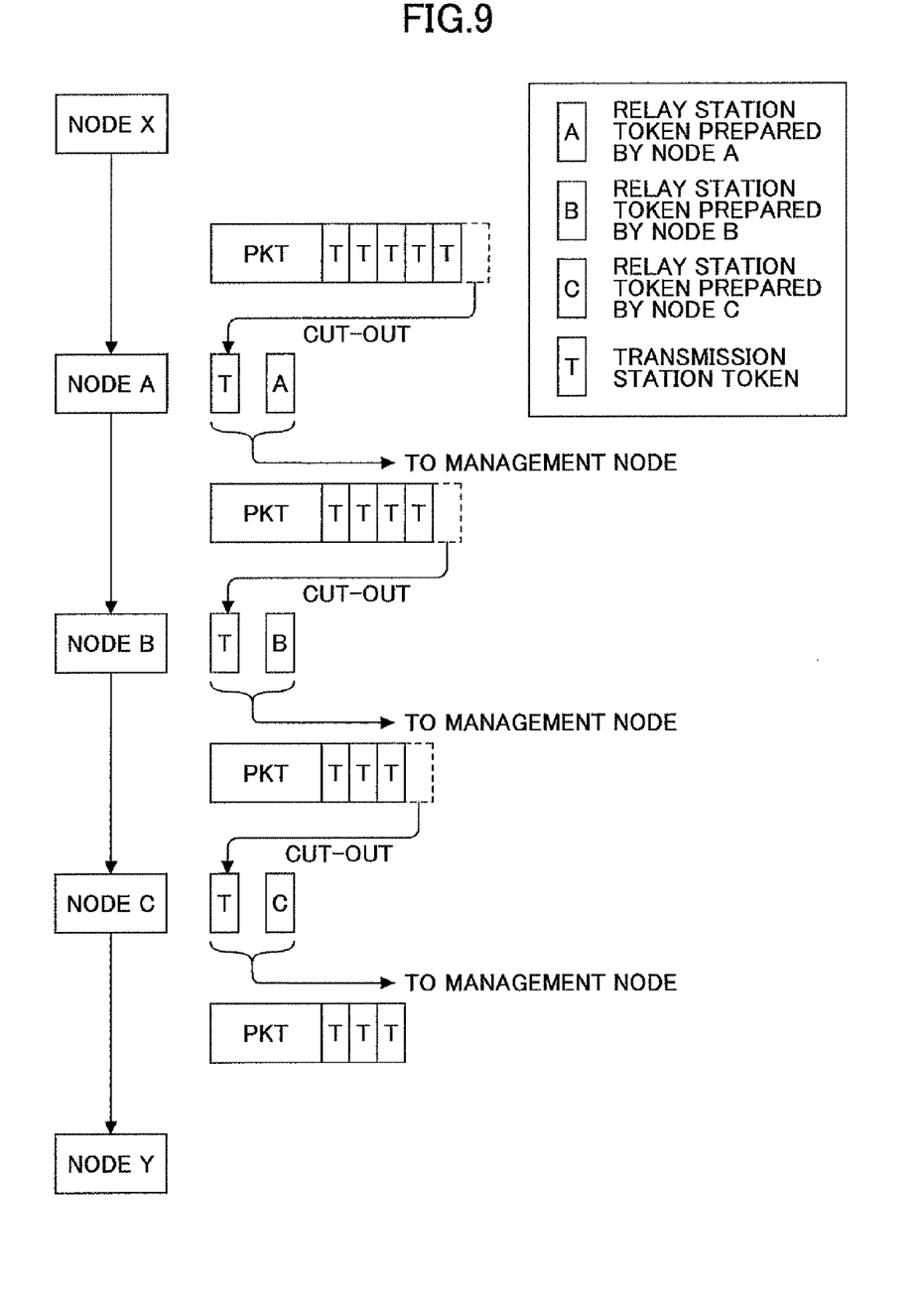
FIG. 9 is a schematic diagram illustrating an example of an operation according to a third embodiment of the present invention (a case where a ticket is sufficient)

FIG. 9 illustrates an exemplary operation according to the third embodiment of the present invention. Similar to the first embodiment, a packet PKT is transmitted from node X to node Y via nodes A, B, and C.

First, the node X transmits the packet PKT and ticket data to the node A. The node A receives the packet PKT and the ticket data from the node X. In the third embodiment, plural transmission station tokens (ticket data) T are prepared by the transmission source node X. Whenever a relay is performed, a single transmission station token T is removed. The data included in each transmission station token T may be substantially the same as the data illustrated in FIG. 7. The plural prepared transmission station tokens T may all be substantially the same. Alternatively, all or a part of the plural prepared transmission station tokens T may be distinguishable from others tokens. From the standpoint of distinguishing the transmission station tokens of each node, the latter case is preferable. In the latter case, the transmission station token includes some sort of identification data in addition to the data illustrated in FIG. 7. The node A, in addition to preparing a relay station token indicated as "A", prepares a transmission station token indicated as "T". Since the relay station token is described above, further explanation of the relay station token is omitted. The node A prepares the transmission station token T by cutting out (removing) a predetermined portion of the received signal. It is to be noted that the amount of tickets to be cut out may be changed in correspondence with communication cost.

As illustrated in FIG. 9, the node A removes a portion of a received signal and transfers the remaining received signal to a succeeding node B. Further, the node A reports the transmission station token T removed from the received signal and the relay station token A to the management node M. The report may be conducted regularly or irregularly. The report may be conducted in units of packets or in units of frames containing plural packets. Similar to the second embodiment, the report data may be encrypted using any suitable method in known in the field of the art.

The node B receives a signal including the packet PKT and the transmission station tokens T, removes a transmission station token T of one times worth, and transfers the remaining signal to a succeeding node C. The node B encrypts report data including the relay station token B and the transmission station token T and reports the report data regularly or irregularly.

The node C receives a signal including the packet PKT and the transmission station tokens T, removes a transmission station token T of one times worth, and transfers the remaining signal to a succeeding node Y. The node C encrypts report data including the relay station token C and the transmission station token T and reports the report data regularly or irregularly.

The node Y receives a signal including the packet PKT and the transmission station token T. Thereby, the transmission data (packet PKT) prepared by the node X reaches the node Y via a multi-hop route (nodes X, A, B, C, Y). The same as the second embodiment, the destination node Y of the third embodiment does not need to report cost data to the management node M.

Figure 10:
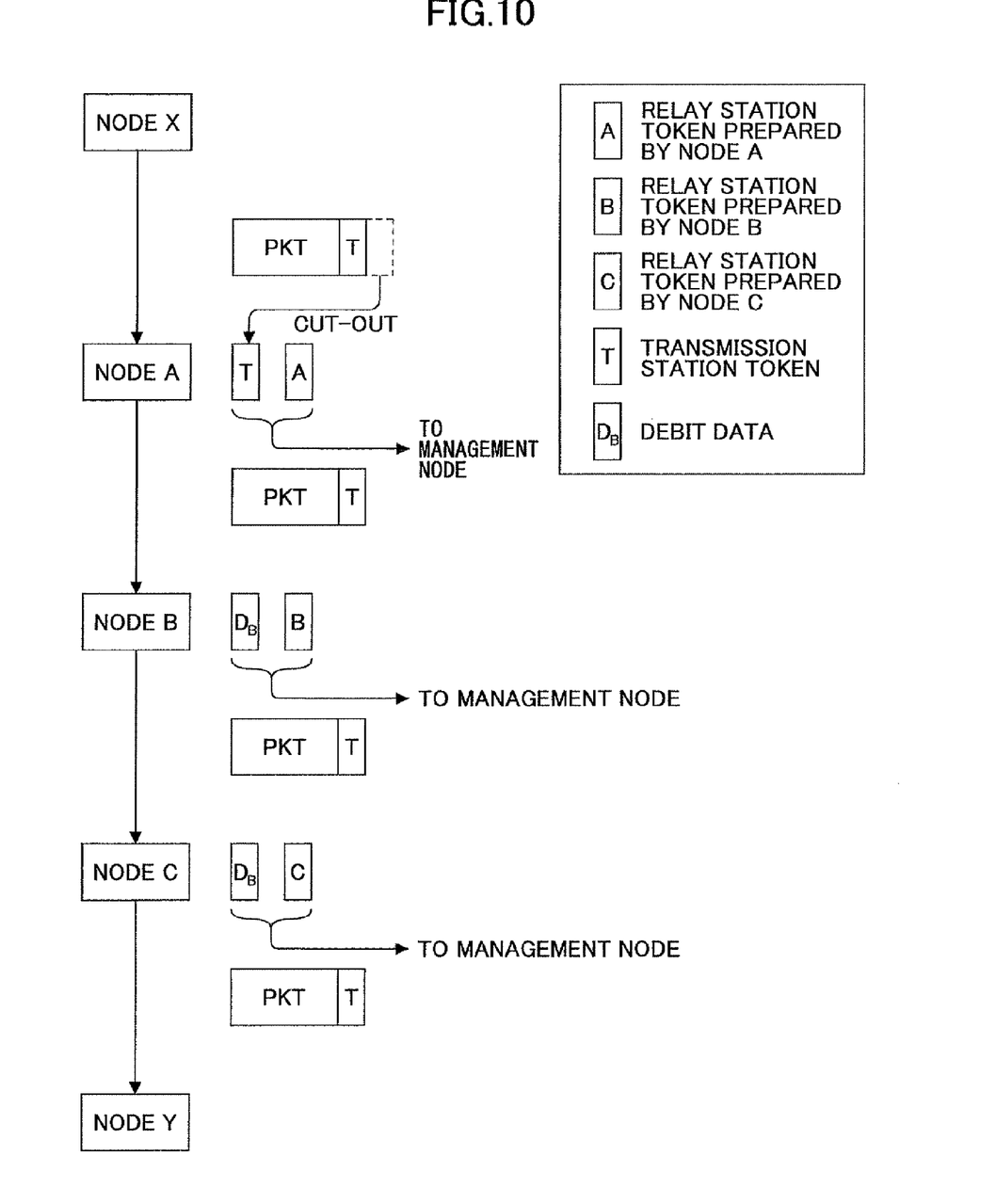
FIG. 10 is a schematic diagram illustrating another example of an operation according to the third embodiment of the present invention (a case where a ticket is insufficient)

FIG. 10 illustrates an exemplary operation in a case where transmission station tokens (ticket data) are insufficient. For the sake of illustration, transmission station tokens of only two times worth are prepared by the node X. In this case, the nodes A and B operate substantially in the same manner as those of the exemplary operation illustrated in FIG. 9. However, when the node B removes a transmission station token T from a received signal, the remaining received signal will lack data indicating a transmission station token(s). In this case where the succeeding node C is not the destination node, the node C is unable to obtain data of the transmission station token and cannot report the contribution of the relay by the node C to the management node M.

One method of solving this problem is to prevent the removing (cutting out) a transmission station token(s) when the transmission station token is the last transmission station token. In this case, as illustrated in FIG. 10, the node B prepares debit data $D_B$ in addition to transferring the received signal to node C. The debit data $D_B$, in addition to including data of the transmission token T, includes data indicating that sufficient transmission station tokens were not included in the relayed signal. The report data including the relay station token C and the debit data $D_B$ are reported to the management node M. The node C, also being prevented from cutting out the last transmission station token T from the received signal, transfers the received signal to a succeeding node Y. Instead of cutting out the last transmission station token T, the node C prepares debit data $D_B$ by duplicating the last transmission station token T. However, because the node Y succeeding the node C is the destination node, the node C may cut out the last transmission station token T from the received signal and not prepare any debit data.

In the example illustrated in FIG. 10, each of the relay nodes reports debit data $D_B$ to the management node M when the transmission station token (ticket data) is deficient. However, it is not required for debit data $D_B$ to be independently reported to the management node M from each of those relay nodes. For example, instead of reporting debit data $D_B$ to the management node from each of those relay nodes, debit data $D_B$ together with transmission data PKT may be transferred from one relay node to an adjacent relay node (succeeding node), so as to allow the debit data $D_B$ to be finally reported from the destination node Y to the management node M.

<Communications Node>

Figure 11:
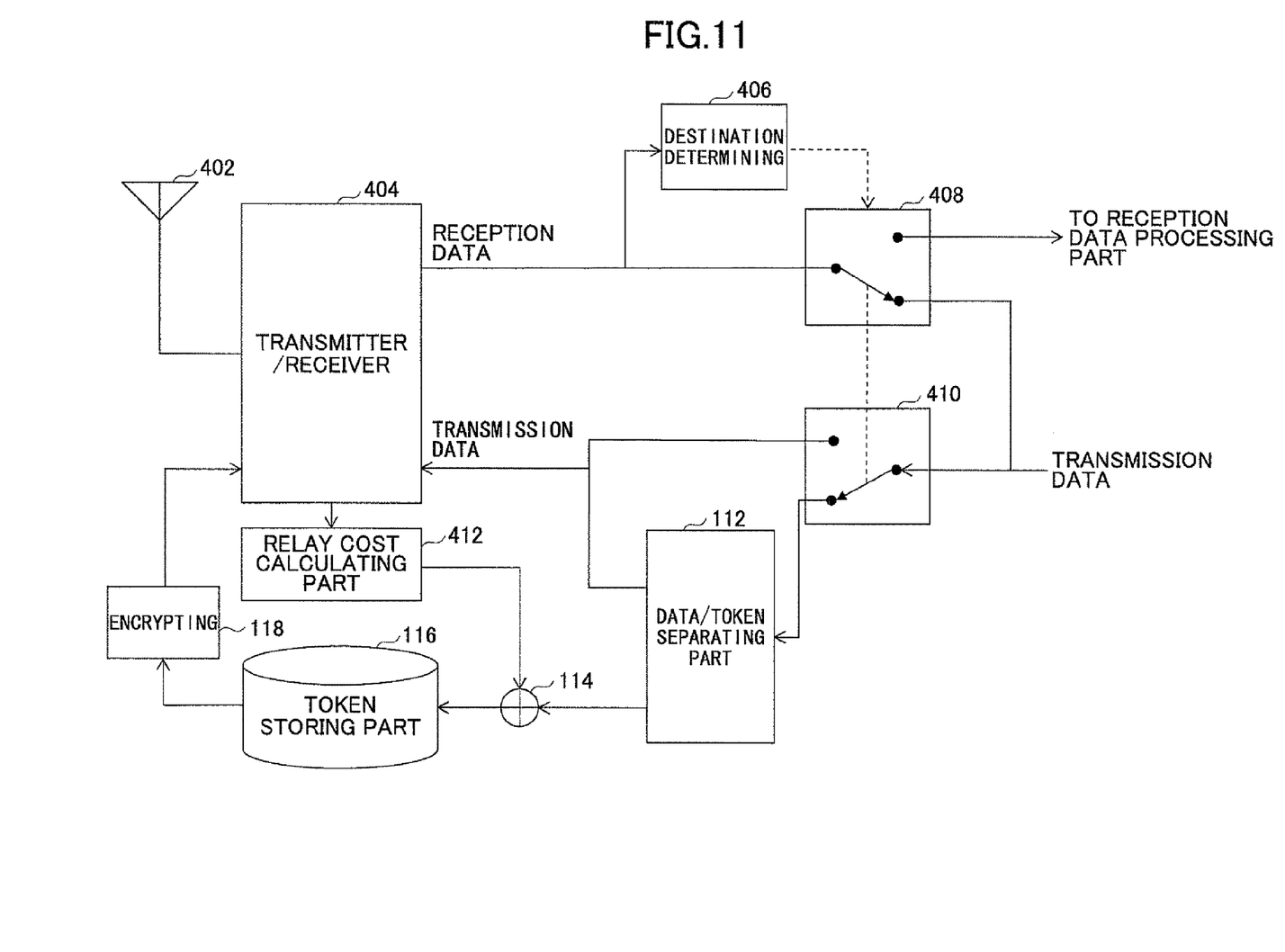
FIG. 11 is a block diagram illustrating a communication node used in the third embodiment of the present invention.

FIG. 11 schematically illustrates a block diagram of a communications node according to the third embodiment of the present invention. The communications node is substantially the same as the communications node of the first and second embodiments. Like components of the communications node of the third embodiment are denoted with like reference numerals as those of the first and second embodiments and are not further explained. In FIG. 11, a data/token separating part 112, a combining part 114, a token storage part 116, and an encrypting part 118 are illustrated.

The data/token separating part 112 prepares a transmission station token T by separating (cutting out) a predetermined portion of a received signal prior to relaying the received signal. In a case where the transmission station token T is the last transmission station token T and the succeeding node is not the destination node, the cutting out of the last transmission station token T is prevented. Instead, the data/token separating part 112 prepares debit data $D_B$ including a duplicate of the transmission station token of the last times worth.

The combining part 114 combines a relay station token from the relay cost calculating part 412 and a transmission station token (or debit data $D_B$), and outputs the combination as report data.

The token storage part 116 stores the report data.

The encrypting part 118 extracts the report data at a predetermined timing for performing the reporting, encrypts the extracted report data, and outputs the encrypted report data to the transmitter/receiver 404.

Fourth Embodiment

The categorization of the above-described embodiments is not an essential part of the present invention. Two or more of the above-described embodiments may be used according to necessity. For example, in a case where only the second embodiment is used, a node having obtained a transmission station token by using some method might dishonestly declare a contribution together with the node's relay station token. However, by combining the first and second embodiments, such dishonest declaration can be positively eliminated because the destination node Y reports the relay station token to the management node M in a successive order of the multi-hop route. This also applies to a case where the first and third embodiments are combined.

Figure 12:
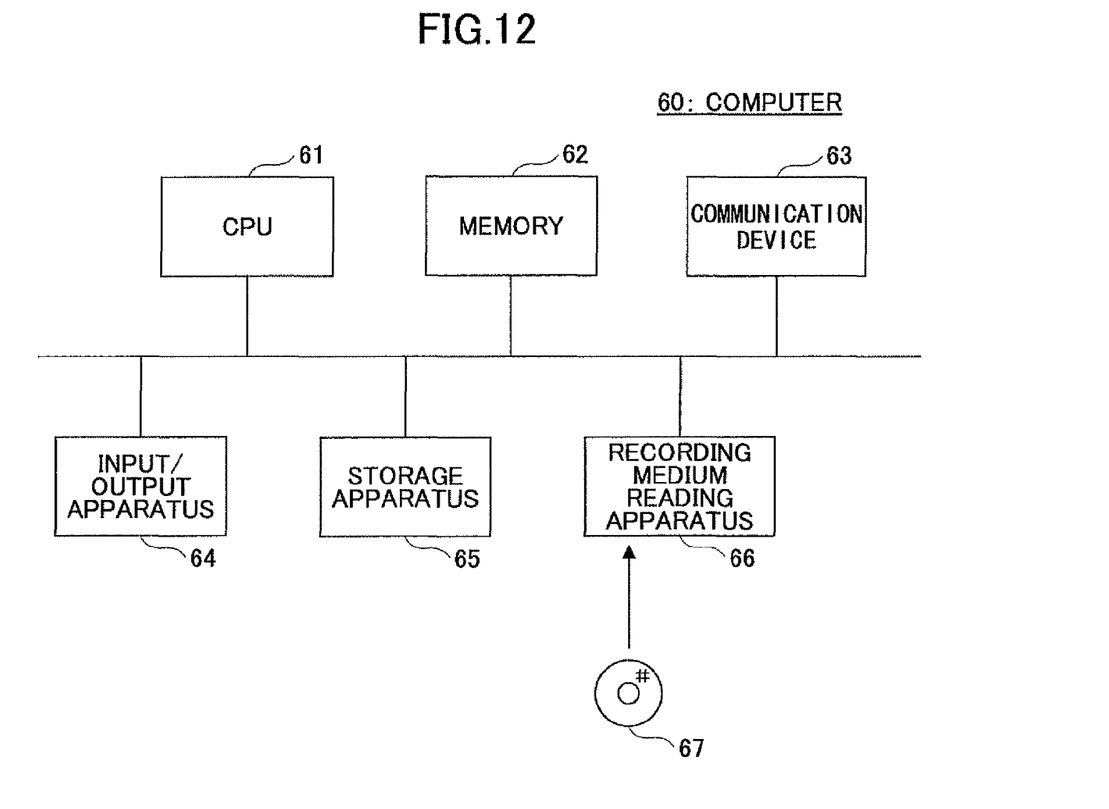
FIG. 12 is a block diagram of a hardware configuration of a communications node according to an embodiment of the present invention.

The above-described communications nodes as illustrated in, for example, FIGS. 4, 5, 8, and 11 may have a hardware configuration of a computer 60 illustrated in FIG. 12.

The computer 60 includes, for example, a CPU 61, a memory 62, a communications device 63, an input/output terminal 64, a storage device 65, and a reading device 66 for reading a recording medium 67 (e.g., CD-ROM). It is, however, to be noted that the computer 60 is not limited to the hardware configuration illustrated in FIG. 12. For example, the computer 60 may have a configuration including the CPU 61, the memory 62, and the communications device 63, or a configuration simply including the CPU 61 and the memory 62.

Further, a program for performing a method using the communications node according to an embodiment of the present invention may be recorded in the recording medium 67 (e.g., CD-ROM). The recording medium 67 may be read by the reading device 66 and installed in the computer 60. Further, the program may also be downloaded from a server in a network via the communications device 63.

The above-described embodiments of the present invention can be widely applied to an ad hoc network such as a system using BWA technology promoted for standardization by IEEE 802.16, fourth generation cellular systems, and sensor network systems promoted for standardization by IEEE 802.15. Although the above-described embodiments of the present invention are particularly advantageous for a wireless ad hoc network, the above-described embodiments of the present invention may be applied to a system that is entirely or partly composed of wire links. Moreover, because the cost required for relaying wireless signals can be appropriately calculated with the present invention, the above-described embodiments of the present invention can be advantageously used in areas having various mixtures of communication methods.

Although the embodiments of the present invention have been described in detail, it should be understood that the various changes, substitutions, and alterations could be made hereto without departing from the spirit and scope of the invention. Although the embodiments of the present invention have been described with specific numbers for helping understanding thereof, the numerals are merely for illustrative purposes, and any suitable number may be applied. Although the apparatus according to the embodiments of the present invention is described by using functional block diagrams for the sake of explanation, the apparatus may be realized by hardware, software or a combination thereof according to necessity.

What is claimed is:

1. A wireless communications node included in a multi-hop route from a source node to a destination node, the wireless communications node comprising:
   a receiving part configured to receive signals including transmission data prepared by the source node;
   a transferring part configured to remove a signal portion including a predetermined amount of ticket data from the received signals and transfer a remaining portion of the received signals to a succeeding node;
   a preparing part configured to prepare source node data including at least identification data of the source node based on the signal portion; and
   a reporting part configured to report the source node data and relay data to a management node that manages cost data of a plurality of nodes included in an ad hoc network;
   wherein the relay data include the cost data and station data including at least identification data of the wireless communications node; wherein the cost data change in correspondence with a load for relaying the transmission data.

2. The wireless communications node as claimed in claim 1, wherein in a case where a predetermined amount of ticket data is not included in the received signals,
   the transferring part is configured to transfer substitute signals including the transmission data and debit data to the succeeding node instead of removing the signal portion from the received signals and transferring the remaining portion of the received signals,
   the debit data indicate that sufficient data are not included in the signals prepared by the source node, and
   the reporting part is configured to report the relay data and the debit data to the management apparatus.

3. The wireless communications node as claimed in claim 1, wherein the reporting part is configured to regularly report the relay data.

4. The wireless communications node as claimed in claim 1, further comprising:
   an encrypting part configured to encrypt the relay data;
   wherein the reporting part is configured to report the encrypted relay data to the management node.

5. The wireless communications node as claimed in claim 1, wherein the station data include one or more of data indicating a relay time, identification data of a relay source node, and identification of a relay destination node.

6. The wireless communications node as claimed in claim 1, wherein the cost data include one or more data indicating a transfer time, a data length, a transmission power, a communication quality of a wireless link, and distance between nodes.

7. The wireless communications node as claimed in claim 1, wherein the source node data include one or more data indicating a data length, a transmission time from the source node, and a destination node.

8. A method used by a wireless communications node included in a multi-hop route from a source node to a destination node, the method comprising:
- receiving signals including transmission data prepared by the source node;
- removing a signal portion including a predetermined amount of ticket data from the received signals;
- transferring a remaining portion of the received signals to a succeeding node; and
- reporting the source node data and relay data to a management node that manages cost data of a plurality of nodes included in an ad hoc network;

wherein the source node data including at least identification data of the source node are prepared based on the signal portion;

wherein the relay data include the cost data and station data including at least identification data of the wireless communications node;

wherein the cost data changes in correspondence with a load for relaying the transmission data.

* * * * *